United States Patent [19]
Bonk

[11] Patent Number: 6,017,090
[45] Date of Patent: Jan. 25, 2000

[54] SEAT RECLINER

[75] Inventor: Jeffery T. Bonk, Clinton Township, Mich.

[73] Assignee: Fisher Dynamics Corporation, St. Clair Shores, Mich.

[21] Appl. No.: 09/146,891

[22] Filed: Sep. 3, 1998

[51] Int. Cl.[7] ............................... B60N 2/20; B60N 2/22
[52] U.S. Cl. ............... 297/362.12; 297/375; 297/378.12
[58] Field of Search ........................... 297/361.1, 362.11, 297/362.12, 362.14, 363, 364, 365, 378.1, 378.12, 375

[56] References Cited

U.S. PATENT DOCUMENTS

| | | |
|---|---|---|
| 5,660,440 | 8/1997 | Pejathaya . |
| 5,707,112 | 1/1998 | Zinn ................................... 297/362.14 |
| 5,769,493 | 6/1998 | Pejathaya . |
| 5,813,725 | 9/1998 | Robinson . |
| 5,823,622 | 10/1998 | Fisher, IV et al. ...................... 297/375 |
| 5,918,939 | 7/1999 | Magadanz ................................ 297/375 |

*Primary Examiner*—Anthony D. Barfield
*Attorney, Agent, or Firm*—Harness, Dickey Pierce, P.L.C.

[57] ABSTRACT

A seat recliner for interconnecting a seatback for pivotal movement relative to a seat bottom is provided. The seat recliner includes a housing and a recliner rod having one end supported for movement relative to the housing, a lock pawl retained in a predefined memory position relative to the housing for movement between a locked position and a released position, and a recline actuator assembly which can be selectively actuated for moving the lock pawl from its locked position to its released position to adjust the use position of the seatback. The seat recliner further includes a lock pin supported from the housing for movement between a first position and a second position, and a dump actuator assembly for selectively moving the lock pin from its first position to its second position. In its first position, the lock pin retains the lock pawl in the memory position. However, with the lock pin in its second position, the lock pawl is released for movement with the recliner rod to permit the seatback to be folded to its forward dumped position. The seat recliner is operable to retain the lock pin in its second position when the lock pawl is moved out of the memory position. When the seatback is returned to its previous use position, the resulting movement of the recliner rod causes the lock pawl to return to the memory position and the lock pin to return to its first position for relatching the seatback in its previous use position.

24 Claims, 9 Drawing Sheets

SEAT RECLINER

BACKGROUND OF THE INVENTION

1. Field of the Invention

The present invention relates generally to seats for use in motor vehicles and, more specifically, to a seat recliner having a memory dump mechanism which allows the seatback to be released for movement to a forward dumped position and subsequently relatched in its previous use position.

2. Description of Background Art

Virtually all passenger-type motor vehicles are now equipped with front seats having a recliner mechanism which can be selectively actuated for permitting the angular position of the seatback to be adjusted relative to the seat bottom through a range of use positions defined between an upright position and a fully-reclined position. In most two-door vehicles, the front seats also include a dump mechanism which can be selectively actuated for permitting the seatback to be pivoted to a forward dumped position for providing greater access to the rear seating area of the vehicle's passenger compartment. In many applications, the recliner mechanism is released in response to actuation of the dump mechanism for permitting the seatback to move to its dumped position. Upon the seatback being returned from its dumped position, the recliner mechanism automatically relatches the seatback in a predefined use position such as, for example, the upright position. Thus, the seat occupant must, in many instances, actuate the recliner mechanism to adjust the position of the seatback if a different use position is preferred.

To eliminate this inconvenience, some dump mechanisms include a memory feature which functions to automatically relatch the seatback in its previous use position following return of the seatback from its dumped position. While a variety of such memory dump mechanisms are currently available, most are relatively complex and expensive. Thus, a continuing need exists to develop alternative dump mechanisms which provide the memory feature in an arrangement that is simple in construction, less expensive to produce, and which can be adapted for use in conjunction with existing recliner mechanisms.

SUMMARY OF THE INVENTION

Accordingly, the present invention is directed to a seat recliner for use in a seat assembly having a seatback supported for pivotal movement relative to a seat bottom. The seat recliner includes a housing adapted to be secured to one of the seatback and the seat bottom, and a recliner rod having a first end secured to the other of the seatback and the seat bottom and a second end supported for movement relative to the housing. The seat recliner further includes a recline latch assembly having a lock pawl retained in a predefined memory position relative to the housing for movement between a locked position and a released position, a recline actuator assembly which can be selectively actuated for moving the lock pawl from its locked position to its released position, and a first biasing device for normally biasing the lock pawl toward its locked position. In its locked position, the lock pawl is in latched engagement with the second end of the recliner rod. In its released position, the lock pawl is released from latched engagement with the second end of the recliner rod. The seat recliner further includes a dump latch assembly having a lock pin supported from the housing for movement between a first position and a second position, a dump actuator assembly for selectively moving the lock pin from its first position to its second position, and a second biasing device for normally biasing the lock pin toward its first position. In its first position, the lock pin retains the lock pawl in the memory position. However, with the lock pin in its second position, the lock pawl is released for movement relative to the memory position.

The recline latch assembly is normally operable with the lock pawl located in its locked position and the dump latch assembly is normally operable with the lock pin located in its first position, whereby the recliner rod is prevented from moving relative to the housing and the seatback is retained in a selected use position. When it is desired to adjust the use position of the seatback, the recline actuator assembly is actuated to move the lock pawl from its locked position to its released position while the lock pin is maintained in its first position. Thus, the second end of the recliner rod is released to move relative to the housing for permitting a corresponding adjustment in the use position of the seatback. When it is desired to move the seatback from its use position to its forward dumped position, the dump actuator assembly is actuated to move the lock pin from its first position to its second position while the lock pawl is maintained in its locked position. As such, the lock pawl maintains latched engagement with the second end of the recliner rod and is released from engagement with the lock pin. Thus, the lock pawl moves relative to the housing from the memory position to a dump position in response to linear movement of the recliner rod caused by movement of the seatback to its forward dumped position. Furthermore, the seat recliner is operable to retain the lock pin in its second position when the lock pawl is moved out of the memory position. When the seatback is returned from its forward dumped position to its previous use position, the resulting movement of the recliner rod causes the lock pawl to return to the memory position and the lock pin to return to its first position for relatching the seatback in its previous use position.

To provide means for retaining the lock pin in its second position, the seat recliner of the present invention further includes a memory latch assembly having a lockout member supported for movement between a first position and a second position, and a third biasing device for normally biasing the lockout member toward its second position. The lockout member is held in its first position by the lock pawl in the memory position and permits movement of the lock pin between its first and second positions. The third biasing device causes the lockout member to move to its second position in response to movement of the lock pawl out of the memory position. The lockout member functions in its second position to retain the lock pin in its second position during travel of the lock pawl resulting from forward dumping of the seatback. Upon the return of the seatback to its previous use position, the lock pawl engages the lockout member and moves it from its second position to its first position and releases the lock pin for subsequent movement to its first position, thereby retaining the lock pawl in the memory position for automatically relatching the seatback in its previous use position.

As a further convenience feature, the seat recliner also includes a seatback stop arrangement for preventing rearward angular movement of the seatback upon actuation of the dump actuator assembly. Thus, a person actuating the dump actuator assembly does not have to physically restrain the seatback against undesired rearward movement and, as such, is afforded greater convenience in using the memory dump feature.

Further scope of applicability of the present invention will become apparent from the detailed description given hereinafter. However, it should be understood that the detailed description and specific examples, while indicating a preferred embodiment of the present invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings wherein.

DETAILED DESCRIPTION OF THE PREFERRED EMBODIMENT

Figure 1:
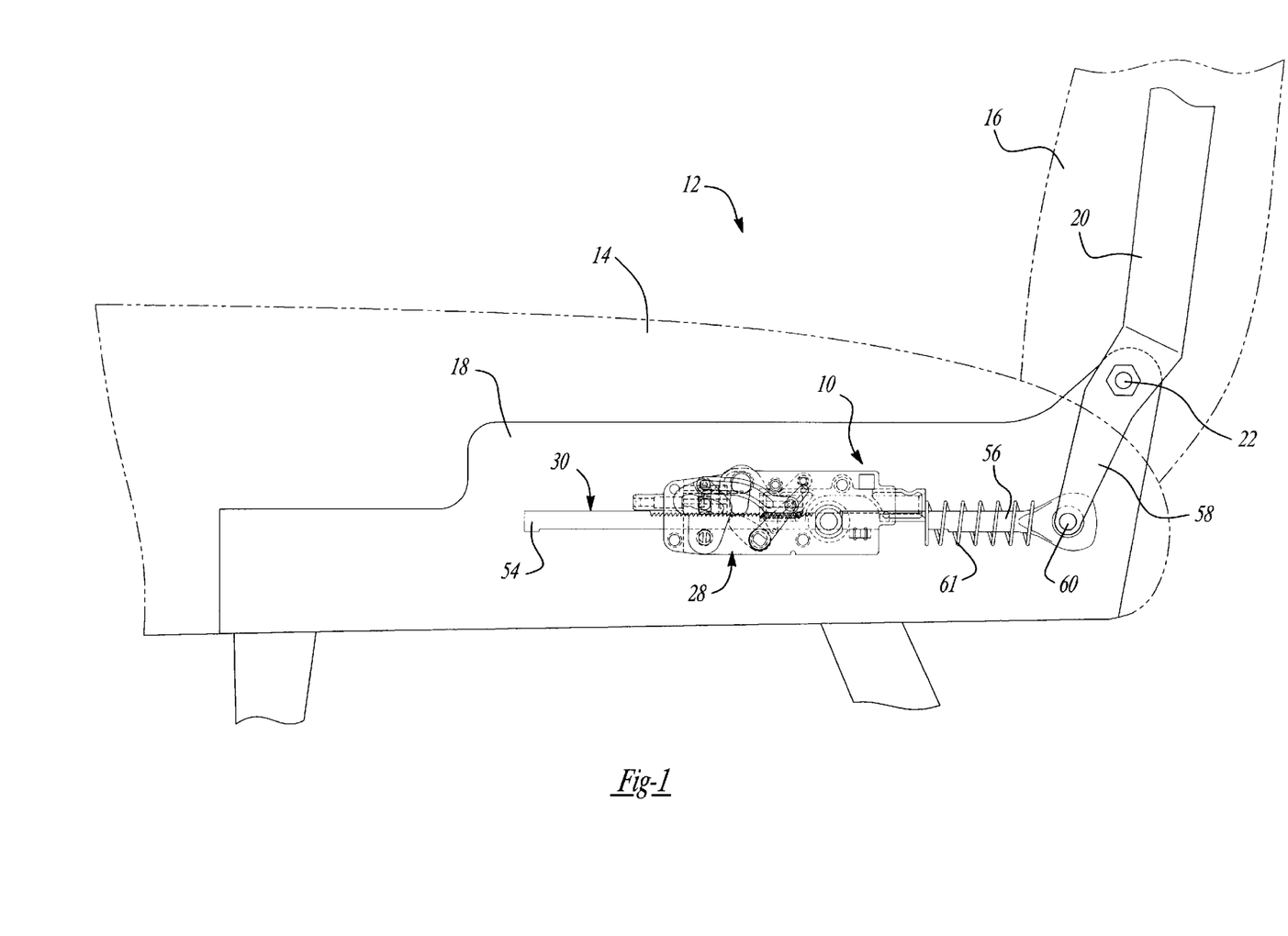
FIG. 1 is a side view of a seat assembly equipped with a seat recliner according to the present invention.
Figures 2, 3:
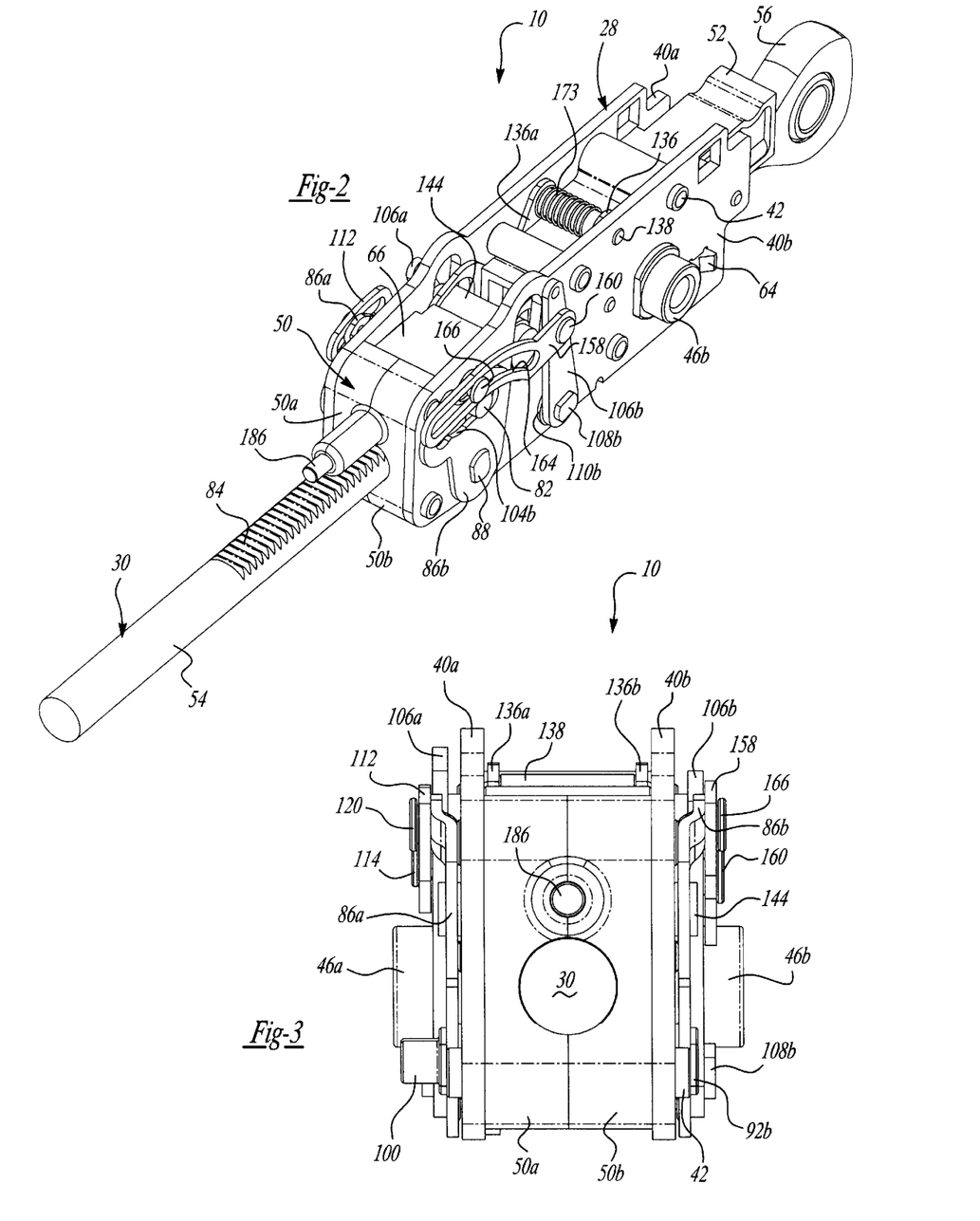
FIG. 2 is a perspective view of the seat recliner of the present invention.
FIG. 3 is an end view of the seat recliner shown in FIG. 2.
Figure 4:
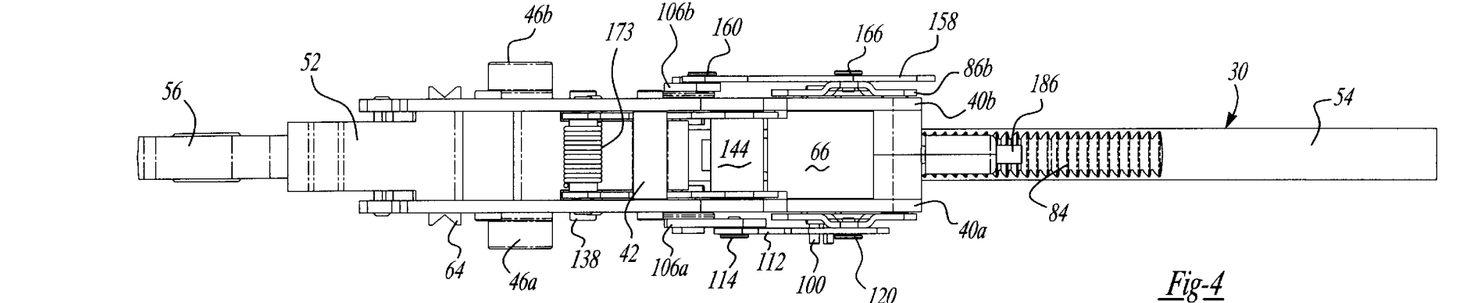
FIG. 4 is a top plan view of the seat recliner shown in FIG. 2.

With reference to FIG. 1 of the drawings, a seat recliner 10 is shown incorporated into a seat assembly 12 having a seat bottom 14 and a seatback 16. While not specifically limited thereto, seat assembly 12 is particularly well-suited for use as the front seat in a motor vehicle. Seat bottom 14 includes a structural frame, with one of its lateral side rails partially shown and identified by reference numeral 18. The structural frame for seatback 16 includes a pair of lateral support arms 20 (one partially shown), each of which is pivotally attached by a hinge pin 22 to seat frame 18. As such, seatback 16 is supported for angular movement relative to seat bottom 14. Those skilled in the art will appreciate that the particular construction of seat assembly 12 is not critical to the novelty of the present invention since it is contemplated that seat recliner 10 can be installed in virtually any seat application where reclining and forward dumping of seatback 16 is required.

As will be detailed, seat recliner 10 is operable for permitting angular movement of seatback 16 relative to seat bottom 14 through a range of available use positions defined between an upright position and a fully-reclined position. Seat recliner 10 is further operable to permit seatback 16 to be pivoted from any use position to a forward dumped position for providing greater access to the area located behind seat assembly 12. Upon return of seatback 16 from its forward dumped position, seat recliner 10 is operable to re-latch seatback 16 in the same use position it had prior to forward dumping (i.e., its "previous" use position).

Seat recliner 10 includes a housing 28 adapted to be fixed to seat frame 18, a recliner rod 30 adapted for attachment to support arm 20 of seatback 16 and which is supported for sliding movement relative to housing 28, a recline latch assembly 32 for releasably latching recliner rod 30 to housing 28, and a recline actuator assembly 34 for controlling selective actuation of recline latch assembly 32. Seat recliner 10 further includes a dump latch assembly 36 for releasably latching a latch component of recline latch assembly 32 in a predefined "memory" position relative to housing 28, and a dump actuator assembly 38 for controlling selective actuation of dump latch assembly 36. While shown with housing 28 mounted to seat bottom 14, those skilled in the art will appreciate that seat recliner 10 can alternatively be located in seatback 16 of seat assembly 12. Specifically, housing 28 can be mounted to one of support arms 20 with recliner rod 30 attached to seat bottom frame 18 at a pivot point located rearwardly of hinge pin 22. In all other aspects, seat recliner 10 operates in the same manner regardless of its mounting location in seat bottom 14 of seatback 16.

Figure 5:
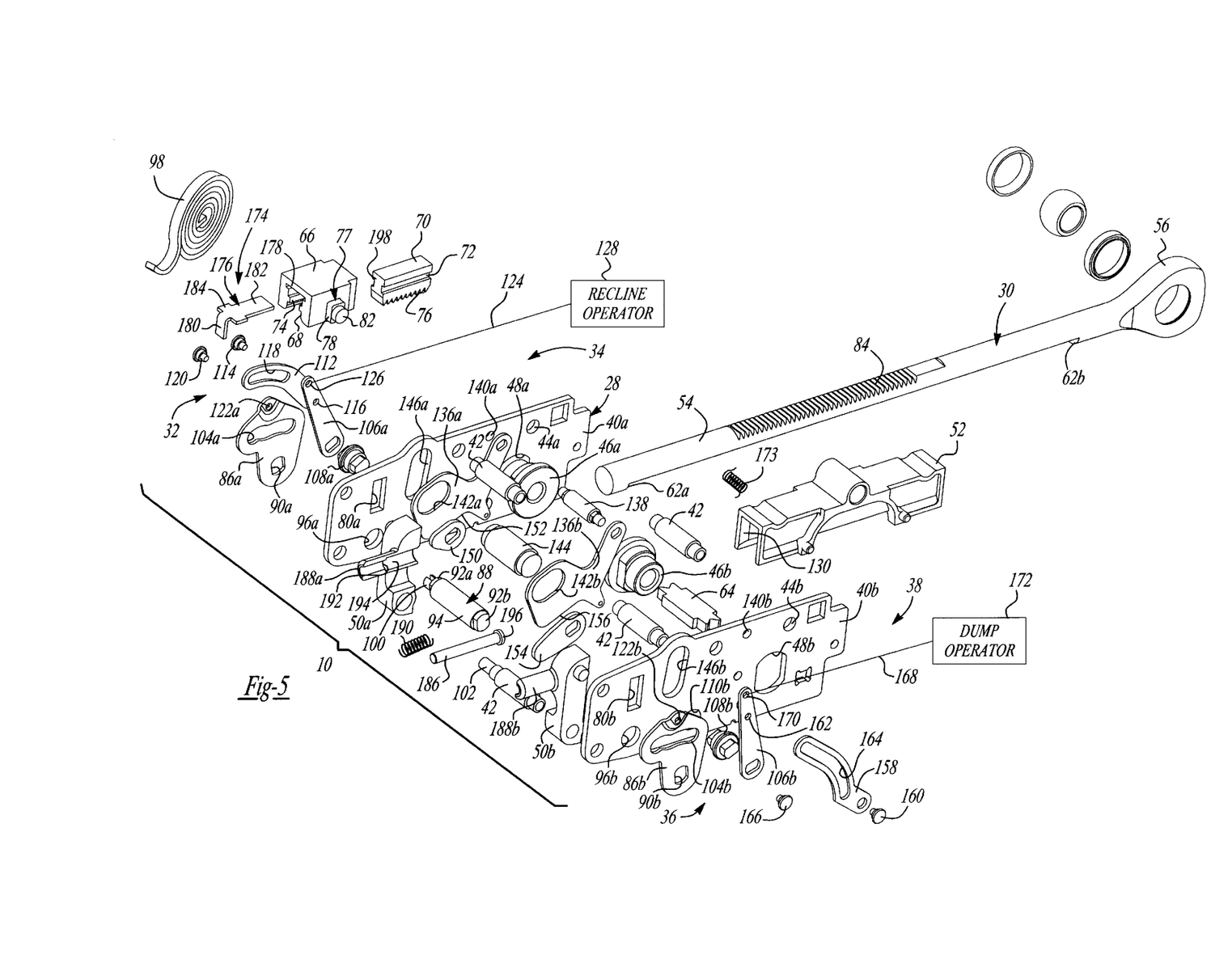
FIG. 5 is an exploded perspective view of the seat recliner shown in FIG. 2.

Housing 28 includes a pair of laterally-spaced plates 40a, 40b that are suitably interconnected by a plurality of spacer pins 42 which extend through sets of aligned apertures 44a, 44b. A pair of trunions 46a, 46b extend through apertures 48a, 48b in plates 40a, 40b and are provided for pivotably mounting housing 28 to seat frame 18. A front rod guide 50 defined by a pair of mating guide members 50a, 50b and an elongated, channel-shaped rear rod guide 52 are retained between plates 40a, 40b and respectively define front and rear guideways for supporting a front end portion 54 of recliner rod 30 therein. A rear end portion 56 of recliner rod 30 is adapted to be pivotally connected to an end portion 58 of support arm 20, such as by a hinge pin 60. As is conventional, a return spring 61 is concentrically mounted on recliner rod 30 between housing 28 and end portion 58 of support arm 20 for normally urging seatback 16 to pivot forwardly about hinge pins 22 to assist in returning seatback 16 to its upright position.

Recline latch assembly 32 is supported by housing 28 and is operable to selectively allow bidirectional non-rotational (i.e., linear) movement of recliner rod 30 relative to housing 28. In particular, recline latch assembly 32 is normally operable in a "locked" mode for securing front end portion 54 of recliner rod 30 in a fixed position relative to housing 28. In contrast, recline latch assembly 32 is selectively operable in a "released" mode to permit front end portion 54 of recliner rod 30 to move linearly with respect to housing 28. With recline latch assembly 32 in its released mode, linear movement of recliner rod 30 in a first (i.e., forward) direction relative to housing 28 results in rearward angular movement of seatback 16 about hinge pins 22 while linear movement of recliner rod 30 in a second (i.e., rearward) direction results in forward angular movement of seatback 16 about hinge pins 22. Engagement of front and rear stop shoulders 62a and 62b formed on the underside of recliner rod 30 with the edge surface of a lateral cross member 64 defines the range of axial movement of recliner rod 30 relative to housing 28 and, in turn, the range of angular movement of seatback 16 relative to seat bottom 14. Recline actuator assembly 34 is operable for permitting a person to selectively shift recline latch assembly 32 from its locked mode into its released mode when it is desired to adjust the use position of seatback 16. As will be described, a biasing arrangement is also provided for normally biasing recline latch assembly 32 for operation in its locked mode.

According to one preferred construction, recline latch assembly 32 includes a cradle 66 formed with an open-ended slide channel 68, and a lock pawl 70 supported in slide channel 68. In particular, longitudinal keyways 72 are provided on opposite lateral sides of lock pawl 70 and are adapted to receive a pair of longitudinal keys 74 formed in slide channel 68 for guiding linear movement of lock pawl 70 relative to cradle 66. In addition, cradle 66 includes a pair of lugs 77 which extend outwardly from its opposite lateral sides. Each lug 77 has a proximal square segment 78 retained in one of aligned rectangular guide slots 80*a*, 80*b* formed in plates 40*a*, 40*b*, and a distal follower pin segment 82 extending from square segment 78. As is evident, the retention of square segments 78 of lugs 77 in guide slots 80*a*, 80*b* acts to retain cradle 66 in a fixed lengthwise position relative to housing 28 while still permitting vertical movement of cradle between a first position and a second position. As will be detailed, dump latch assembly 36 normally functions to retain lock pawl 70 within slide channel 68 of cradle 66 during movement of cradle 66 between its first and second positions for concurrently moving lock pawl 70 between a locked position and a released position. Cradle 66 is in its first position when lugs 77 are located in the lowermost portion of guide slots 80*a*, 80*b*, such that lock pawl 70 is located in its locked position with its teeth 76 meshed with teeth 84 formed on recliner rod 30. In contrast, cradle is in its first position when lugs 77 are located in the uppermost portion of guide slots 80*a*, 80*b*, whereby lock pawl 70 is located in its released position such that its teeth 76 are released from meshed engagement with teeth 84 on recliner rod 30.

Recline latch assembly 32 also includes a pair of laterally-spaced locking cams 86*a*, 86*b* which are fixed to opposite ends of an actuator shaft 88. Specifically, locking cams 86*a*, 86*b* have non-circular apertures 90*a*, 90*b* which receive similarly shaped end segments 92*a*, 92*b* of actuator shaft 88. In addition, a cylindrical spindle segment 94 of actuator shaft 88 is journally supported within corresponding circular apertures 96*a*, 96*b* formed in plates 40*a*, 40*b*. A rewind spring 98 is provided for normally biasing locking cams 86*a*, 86*b* to a forward position. One end of rewind spring 98 is connected to a grooved spring retainer 100 on end segment 92*a* of actuator shaft 88 and the other end of rewind spring 98 is connected to a spring retainer 102 on front spacer pin 42. Locking cams 86*a*, 86*b* include cam slots 104*a*, 104*b* through which pin segments 82 of lugs 77 on cradle 66 extend. Cam slots 104*a*, 104*b* are similarly contoured and aligned such that rotation of locking cams 86*a*, 86*b* between the forward position (FIG. 6) and a rearward position (FIG. 8) causes cradle 66 to move vertically within guide slots 80*a*, 80*b* between its first and second positions for causing movement of lock pawl 70 between its locked and released positions.

To provide means for rotating locking cams 86*a*, 86*b* from the forward position to the rearward position when it is desired to adjust the use position of seatback 16, recline actuator assembly 34 includes a lever link 106*a* fixed to a pivot post 108*a* which, in turn, is rotatably mounted in an aperture 110*a* formed in plate 40*a*. In addition, one end of a recline link 112 is pivotably fixed to lever link 106*a* via a rivet 114 extending through an aperture (not shown) in recline link 112 and an aperture 116 in lever link 106*a*. A lost-motion recline slot 118 is formed in the other end of recline link 112 and has a rivet 120 extending therethrough which is fixed to locking cam 86*a* via an aperture 122*a*. Recline actuator assembly 34 further includes a cable 124 shown connected between an aperture 126 in lever link 106*a* and a recline operator 128. While only schematically shown, recline operator 128 can be any suitable device (i.e., handle, lever, rail, etc.) mounted to seat assembly 12 and which can be manipulated by the seat occupant.

Figure 6:
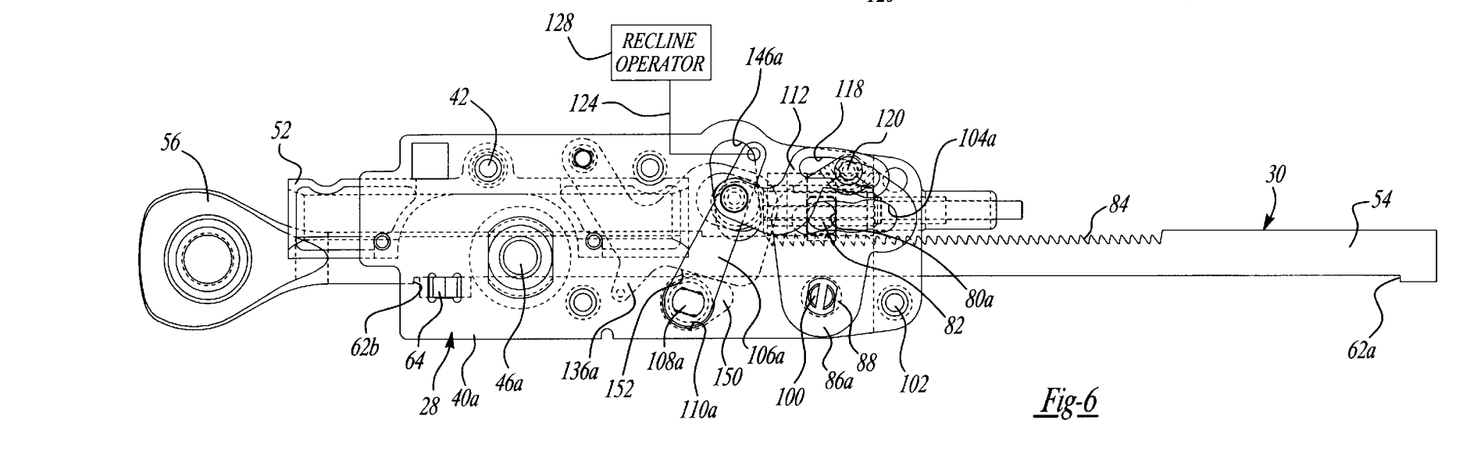
FIGS. 6 and 7 are opposite side views of the seat recliner shown in FIG. 2 illustrating the recline latch assembly in a locked mode and the dump latch assembly in a latched mode for holding the seatback in a selected use position.
Figure 8:
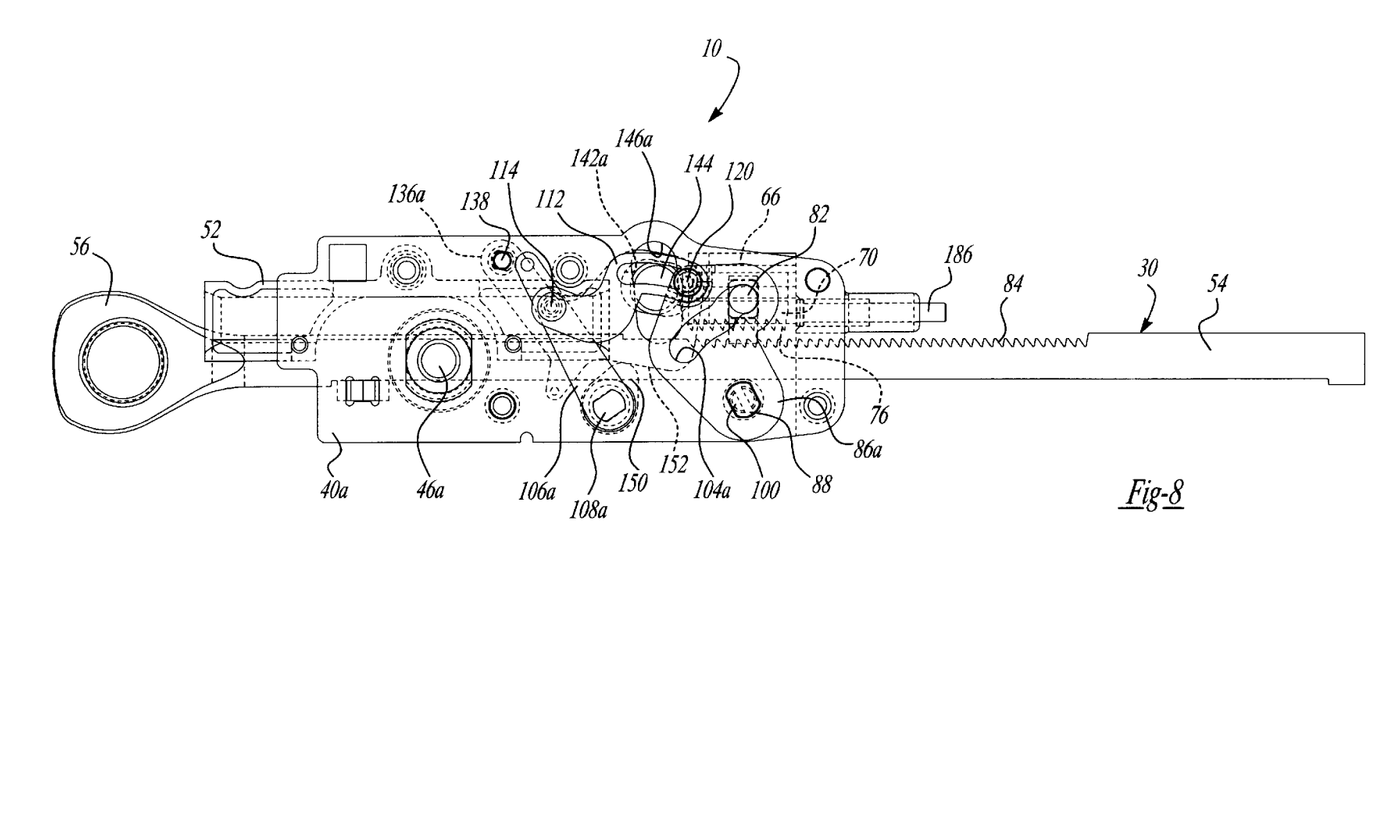
FIG. 8 is a side view, similar to FIG. 6, showing the recline latch assembly in a released mode for permitting selective adjustment of the seatback use position.

Referring to FIG. 6, lever link 106*a* is shown in a non-actuated position with locking cams 86*a*, 86*b* in the forward position. As such, pin segments 82 of lugs 77 on cradle 66 are positioned in a rearward portion of cam slots 104*a*, 104*b* and square segments 78 of lugs 77 are positioned in the lower portion of guide slots 80*a*, 80*b* for locating lock pawl 70 in its locked position and defining the locked mode of recline latch assembly 32. However, when it is desired to adjust the use position of seatback 16, recline latch assembly 32 is shifted from its locked mode into its released mode by actuating recline operator 128 to cause rotation of lever link 106*a* in a rearward direction from its non-actuated position to an actuated position (FIG. 8). Such rotation of lever link 106*a* causes rivet 120 to engage the forward end of recline slot 118 and forcibly rotate locking cams 86*a*, 86*b* from the forward position to the rearward position in opposition to the biasing of rewind spring 98. As noted, such rotation of locking cams 86*a*, 86*b* from the forward position to the rearward position causes pin segments 82 of lugs 77 on cradle 66 to move into the forward portion of cam slots 104*a*, 104*b* and causes square segments 78 of lugs 77 to move upwardly in guide slots 80*a*, 80*b* until lock pawl 70 is located in its released position. Accordingly, the contour of cam slots 104*a*, 104*b* controls vertical movement of cradle 66 and lock pawl 70 in response to rotation of locking cams 86*a*, 86*b* between the forward and rearward positions.

As noted, recline latch assembly 32 can be selectively shifted from its locked mode into its released mode by actuating recline operator 128 to rotate lever link 106*a* and locking cams 86*a*, 86*b*, in opposition to the biasing of rewind spring 98, for causing movement of lock pawl 70 from its locked position to its released position. With lock pawl 70 held in its released position, front end 54 of recliner rod 30 can slide relative to housing 28, thereby permitting adjustment of the use position of seatback 16. Once a desired use position is selected, recline operator 128 is released which, due to the biasing of rewind spring 98, causes reverse rotation of lever link 106*a* and locking cams 86*a*, 86*b* for returning lock pawl 70 to its locked position with its teeth 76 again meshed with teeth 84 on recliner rod 30, thereby automatically shifting recline latch assembly 32 back into its locked mode.

Dump latch assembly 36 is supported by housing 28 and is normally operable in a "latched" mode to retain lock pawl 70 in the predefined memory position and still permit vertical movement of cradle 66 between its first and second positions and corresponding movement of lock pawl 70 between its locked and released positions. The memory position is defined when lock pawl 70 is fully retracted into slide channel 68 of cradle 66. Thus, the memory position functions to identify the current use position of seatback 16 by identifying the current position of meshed engagement between lock pawl teeth 76 and recliner rod teeth 84. Moreover, with dump latch assembly 36 in its latched mode, independent actuation of recline latch assembly 32 via actuation of recline operator 128 is permitted when it is desired to adjust the use position of seatback 16. However, dump latch assembly 36 can be selectively shifted into an "unlatched" mode for permitting sliding movement of lock pawl 70 relative to cradle 66 from the memory position to a dump position in response to linear movement of recliner rod 30 caused by folding of seatback 16 from a use position to its forward dumped position.

When it is desired to move seatback 16 to its forward dumped position, dump actuator assembly 38 is selectively actuated for shifting dump latch assembly 36 into its unlatched mode while recline latch assembly 32 is maintained in its locked mode. As noted, dump latch assembly 36 is operable in its unlatched mode to release lock pawl 70 for sliding movement relative to cradle 66 from the memory position to the dump position in response to movement of seatback 16 toward its forward dumped position. In particular, since teeth 76 on lock pawl 70 are held in meshed engagement with teeth 84 on recliner rod 30 when recline latch assembly 32 is maintained in its locked mode, lock pawl 70 is directly coupled to recliner rod 30. As such, release of lock pawl 70 from slide channel 68 of cradle 66 permits recliner rod 30 and lock pawl 70 to slide rearwardly relative to housing 28 in response to forward folding of seatback 16. Subsequent movement of seatback 16 from its forward dumped position toward its previous use position causes recliner rod 30 and lock pawl 70 to slide forwardly relative to housing 28 until lock pawl 70 is again located in the memory position within slide channel 68 of cradle 66, whereby seatback 16 is located in its previous use position. Rear rod guide 52 includes a longitudinal guide channel 130 that is adapted to work in conjunction with slide channel 68 in cradle 66 for guiding linear bidirectional movement of lock pawl 70 between the memory and dump positions while maintaining engagement of its teeth 76 with rod teeth 84. As will be hereinafter detailed, seat recliner 10 also includes a mechanism operable for holding dump latch assembly 36 in its unlatched mode during sliding travel of lock pawl 70 and subsequently causing dump latch assembly 36 to automatically shift back into its latched mode once lock pawl 70 has returned to the memory position, thereby relatching seatback 16 in its previous use position.

Dump latch assembly 36 includes a pair of laterally-spaced lock levers 136a, 136b fixed to opposite ends of a pivot shaft 138 which has its cylindrical end segments journally mounted in aligned apertures 140a, 140b formed in plates 40a, 40b. Lock levers 136a, 136b have drive slots 142a, 142b formed therein. A lock pin 144 extends through drive slots 142a, 142b and its opposite ends are retained in vertical guide slots 146a, 146b formed in plates 40a, 40b. A recline cam 150 is fixed to pivot post 108a and engages a cam surface 152 formed on lock lever 136a. In addition, dump actuator assembly 38 includes a lever link 106b that is fixed to a pivot post 108b and rotatably mounted in an aperture 110b of plate 40b. A dump cam 154 is fixed to pivot post 108b and engages a cam surface 156 formed on lock lever 136b. One end of a dump link 158 is fixed to lever link 106b via a rivet 160 extending through an aperture 162. An elongated dump slot 164 is formed in the other end of dump link 158. A rivet 166 extends through dump slot 164 and is fixed to locking cam 86b via an aperture 122b. A cable 168 is shown connected between an aperture 170 in lever link 106b and a dump operator 172. Dump operator 172 is, like recline operator 128, any suitable device mounted to seat assembly 12 which is under the control of the seat occupant. Dump slot 164 is adapted to accommodate pivotal movement of locking cams 86a, 86b due to rotation of lever link 106a via recline operator 128 without causing movement of dump link 158 and lever link 106b.

Figure 7:
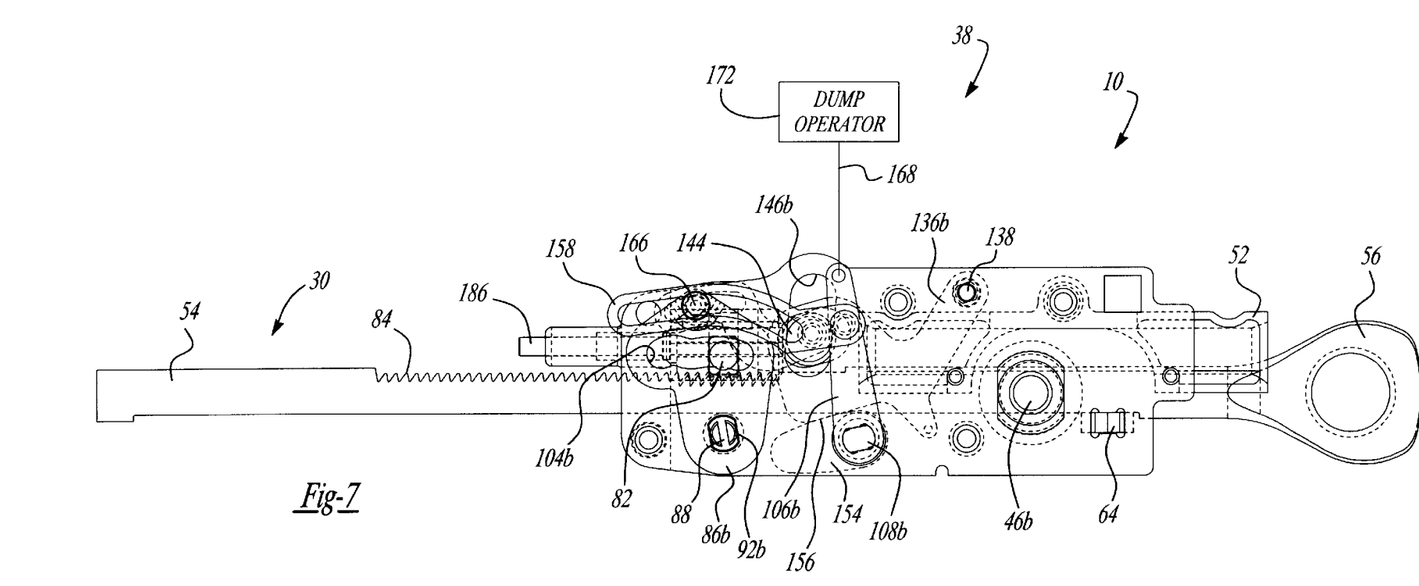
Figure 9:
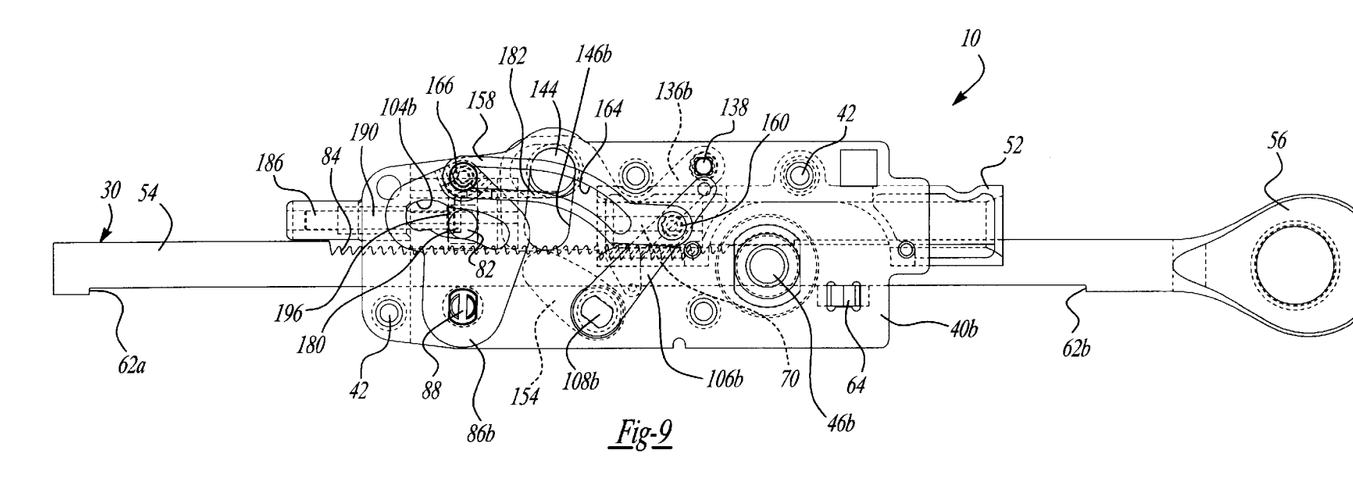
FIG. 9 is a side view, similar to FIG. 7, showing the dump latch assembly in an unlatched mode for releasing the seatback for subsequent movement toward its forward dumped position.

Dump latch assembly 36 is shifted from its latched mode into its unlatched mode by actuating dump operator 172 for rotating lever link 106b from a non-actuated position (FIG. 7) to an actuated position (FIG. 9). This rotation of lever link 106b causes dump cam 154 to engage cam surface 156 on lock lever 136b which, in turn, causes lock levers 136a, 136b to pivot from a first position (FIG. 7) to a second position (FIG. 9). A return spring 173 wound on shaft 138 has one end acting on rear rod guide 52 and the other end acting on one of lock levers 136a, 136b to normally bias lock levers 136a, 136b to the first position and lever link 106b to its non-actuated position. With lock levers 136a, 136b in the first position, drive slots 142a, 142b and guide slots 146a, 146b cause lock pin 144 to be located in a first position behind cradle 66 and lock pawl 70 for preventing movement of lock pawl 70 out of cradle 66, thereby retaining lock pawl 70 in the memory position. In contrast, with lock levers 136a, 136b moved to the second position, lock pin 144 is located in a second position above slide channel 68 of cradle 66 so as to permit sliding movement of lock pawl 70 relative to cradle 66. In addition, rotation of lever link 106b from its non-actuated position to its actuated position causes the front end of dump slot 164 to engage rivet 166 and cause a small amount of rearward rotation of locking cams 86a, 86b for relieving the biasing load exerted by rewind spring 98 on cradle 66 and lock pawl 70.

In accordance with another feature of seat recliner 10, rotation of lever link 106a to its actuated position via recline operator 128 causes recline cam 150 to act on cam surface 152 and rearwardly rotate lock levers 136a, 136b from the first position to a third position in coordination with movement of lock pawl 70 from its locked position to its released position. This third position of lock levers 136a, 136b is located between the first and second positions. As previously noted, lock levers 136a, 136b function in the first position to locate lock pin 144 in its first position for preventing linear movement of lock pawl 70 relative to cradle 66 while lock pawl 70 is in its locked position. Similarly, lock levers 136a, 136b function in the third position to locate lock pin 144 in a third position also preventing linear movement of lock pawl 70 relative to cradle 66 while lock pawl 70 is in its released position. The third position for lock pin 144 is intermediate its first and second positions.

To provide means for maintaining dump latch assembly 36 in its unlatched mode during forward dumping and subsequent return of seatback 16 to its use position, seat recliner 10 includes a memory latch assembly 174 having a lockout member, hereinafter referred to as stop plate 176, which is supported in a longitudinal channel 178 formed in cradle 66 above slide channel 68. Stop plate 176 includes a bent-over flange segment 180 and a plate segment 182 having stop wings 184 extending outwardly therefrom. In addition, a plunger 186 is retained in a tubular chamber defined by tube segments 188a, 188b of front rod guide 50. A spring 190 surrounding plunger 186 is retained between a radial shoulder 192 of a spring chamber 194 and a head segment 196 of plunger 186 for normally biasing plunger 186 rearwardly so as to urge head segment 196 into contact with a front surface of flange segment 180 on stop plate 176. The rear face surface of flange segment 180 on stop plate 176 engages an end surface 198 of lock pawl 70 when lock pawl 70 is in the memory position.

When lock pin 144 is moved to its second position, due to dump latch assembly 36 being shifted into its unlatched mode, subsequent sliding movement of lock pawl 70 from the memory position toward the dump position permits spring 190 to urge plunger 186 to move rearwardly, thereby causing sliding movement of stop plate 176 from a first position to a second position. With stop plate 176 in its first position, plate segment 182 is completely retracted within cradle 66. However, with stop plate 176 in its second position, wings 184 engage blind ends (not shown) of channel 178 such that a portion of plate segment 182 extends outwardly from cradle 66 and below lock pin 144. Thus, upon subsequent release of dump operator 172, lock pin 144 attempts to move to its first position but engages the portion of plate segment 182 extending outwardly from cradle 66 such that stop plate 176 is held in its second position.

When it is desired to move seatback 16 from a use position to its forward dumped position, dump operator 172 is actuated for shifting dump latch assembly 36 into its unlatched mode by rotating lever link 106b to its actuated position. Such rotation of lever link 106b causes lock levers 136a, 136b to be forcibly pivoted, in opposition to the biasing of return spring 173, to the second position. With lock levers 136a, 136b held in the second position, lock pawl 70 is released from engagement with lock pin 144. Since teeth 76 on lock pawl 70 remain in meshed engagement with teeth 84 on recliner rod 30, such meshed engagement acts to identify the current position of recliner rod 30 relative to housing 28 and, thus, the current use position of seatback 16. Thereafter, initial forward angular movement of seatback 16 about pivots 22 toward its forward dumped position causes recliner rod 30 and lock pawl 70 to move linearly in a rearward direction relative to housing 28. In response to such rearward linear movement of lock pawl 70, spring 190 forcibly urges stop plate 176 to move to its second position for holding lock pin 144 in its second position. With lock pin 144 held in its second position, lock levers 136a, 136b are held in the second position and lever link 106b is held in its actuated position. As such, dump latch assembly 36 is held in its unlatched mode during sliding movement of lock pawl 70 from the memory position to the dump position due to movement of seatback 16 from its use position to its forward dumped position.

When it is desired to return seatback 16 from its forward dumped position, seatback 16 is pivoted rearwardly about pivots 22 which causes recliner rod 30 and lock pawl 70 to move linearly in a forward direction. With lock pawl 70 approaching the memory position, its end surface 198 engages flange segment 180 on stop plate 176 for forcibly biasing stop plate 176 to move toward its first position in opposition to the biasing of spring 190. Once lock pawl 70 is completely retracted within cradle 66, stop plate 176 is in its first position and return spring 173 forcibly urges lock levers 136a, 136b to move from the second position to the first position which, in turn, causes lock pin 144 to move to its first position and lever link 106b to move to its non-actuated position, thereby shifting dump latch assembly 36 back into its latched mode for relatching seatback 16 in its previous use position.

Seat recliner 10 also includes a seatback stop arrangement which is operable to prevent rearward angular movement of seatback 16 upon dump latch assembly 36 being shifted into its unlatched mode. As will be recalled, teeth 76 on lock pawl 70 are maintained in meshed engagement with teeth 84 on recliner rod 30 when dump latch assembly 36 is shifted into its unlatched mode such that lock pawl 70 is effectively an extension of recliner rod 30. Thus, lock pawl 70 engages flange segment 180 of stop plate 176 which, in turn, engages front rod guide 50 and prevents forward sliding movement of lock pawl 70 and recliner rod 30 relative to housing 28 past the memory position, thereby preventing reclining rearward movement of seatback 16 past the current reclined position.

Figure 10:
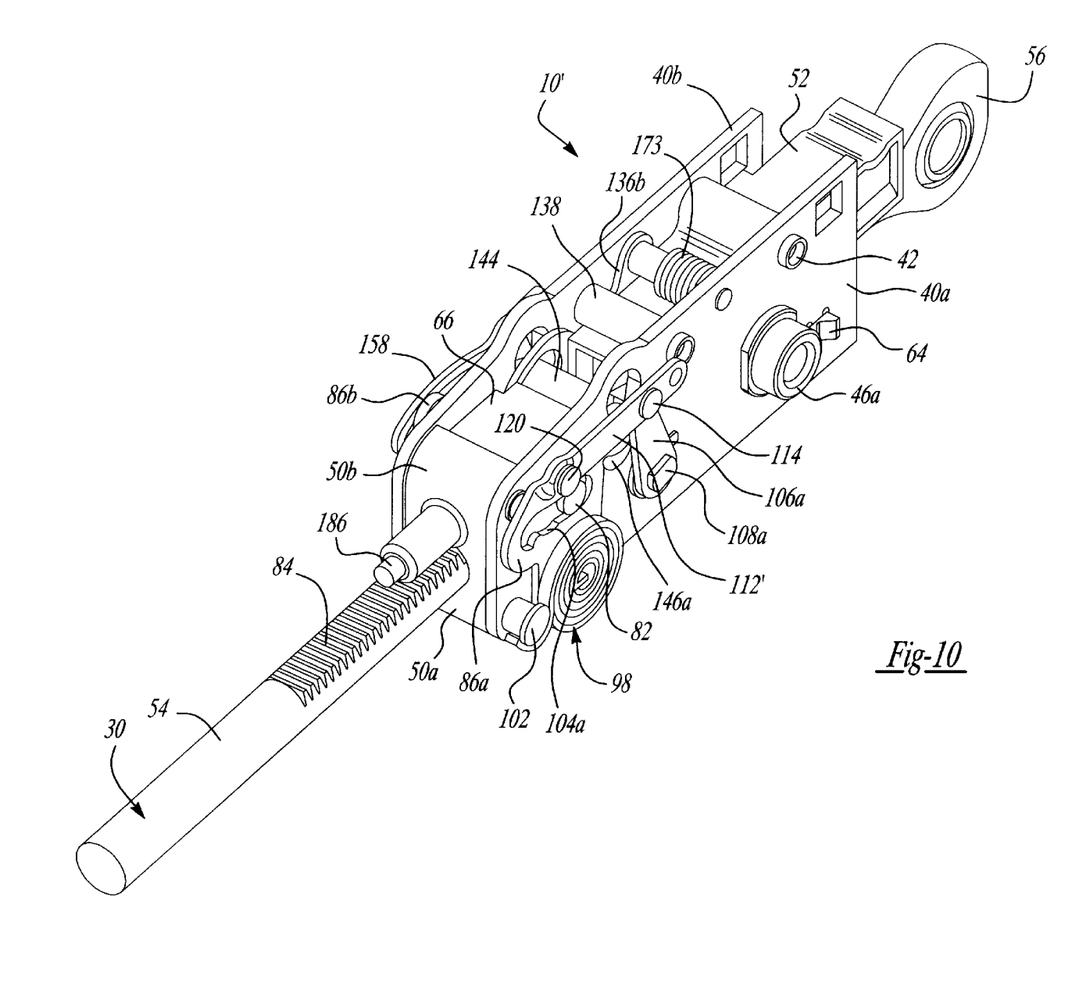
FIG. 10 is a perspective view of a seat recliner constructed in accordance with an alternative embodiment of the present invention.
Figure 11:
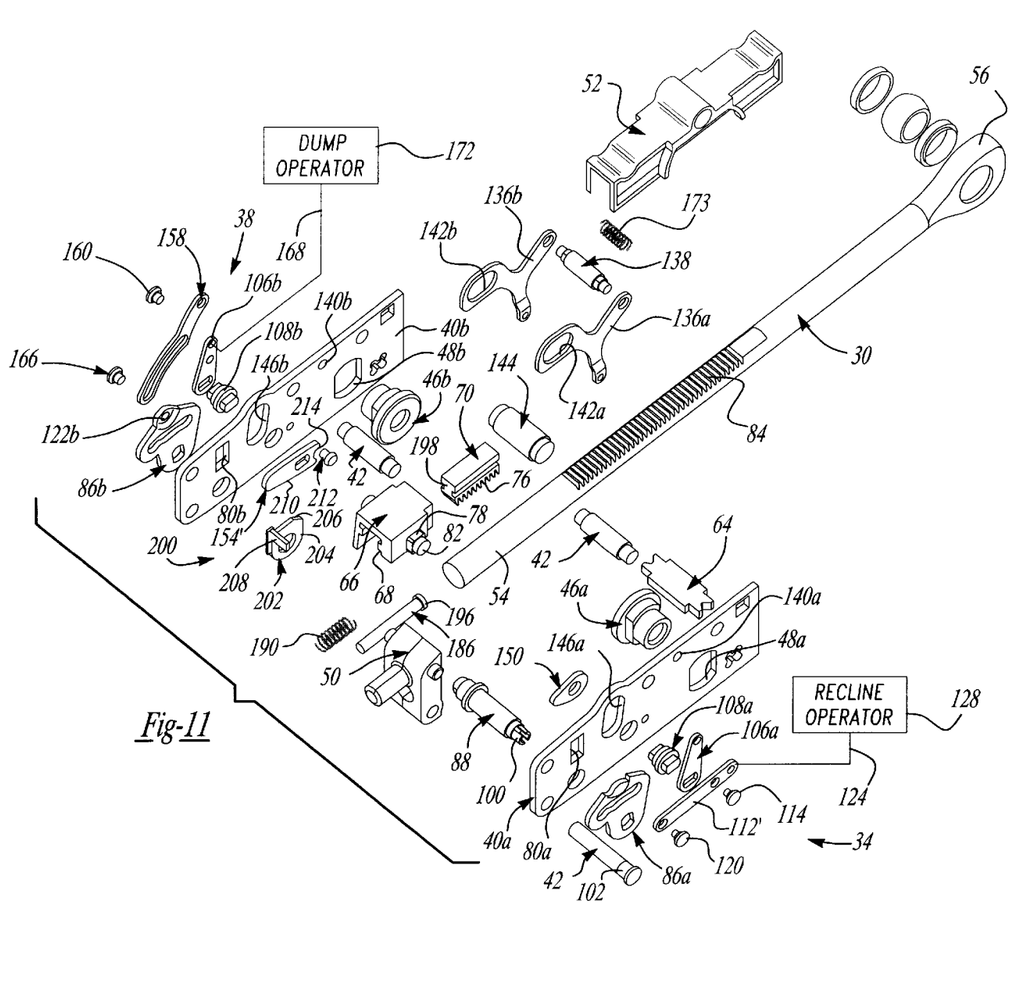
FIG. 11 is an exploded perspective view of the seat recliner shown in FIG. 10.

Referring now to FIGS. 10 and 11, a mirror-image modified version of seat recliner 10 is identified by reference numeral 10'. For brevity, those components of seat recliner 10' that are similar in structure and/or function to components previously described for seat recliner 10 are again identified with common reference numerals. Seat recliner 10' is substantially similar in function to seat recliner 10 and includes an alternative memory latch assembly 200 which also functions to maintain dump latch assembly 36 in its unlatched mode by holding lock pin 144 in its second position during travel of lock pawl 70 out of the memory position. Specifically, memory latch assembly 200 includes a lockout member, hereinafter referred to as trigger plate 202, which is journally supported on shaft 88. Trigger plate 202 includes a cam segment 204 having a cam surface 206, and a flange segment 208. With lock pawl 70 in the memory position and lock pin 144 in its first position, end surface 198 of lock pawl 70 acts on flange segment 208 of trigger plate 202 which, in turn, acts on head segment 196 of plunger 186 for retracting plunger 186 into spring chamber 194 in opposition to the biasing of spring 190. As such, trigger plate 202 is held in a forward position with cam surface 206 of trigger plate 202 disengaged from a cam surface 210 formed on the underside of dump cam 154'.

When lock pin 144 is moved to its second position upon rotation of lever link 106b to its actuated position via actuation of dump operator 172, subsequent sliding movement of lock pawl 70 out of slide channel 68 in cradle 66 permits spring 190 to urge plunger 186 to move rearwardly, thereby causing trigger plate 202 to rotate from its forward position to a rearward position. When trigger plate 202 is in its rearward position, its cam surface 206 engages cam surface 210 of dump can 154' and holds lever link 106b in its actuated position. With lever link 106b held in its actuated position, lock levers 136a, 136b are held in the second position and lock pin 144 is held in its second position, whereby dump latch assembly 36 is held in its unlatched mode. Subsequent return of lock pawl 70 to the memory position causes end surface 198 to engage flange segment 208 and forcibly rotate trigger plate 202 back to its forward position, thereby releasing cam surface 206 from dump cam 154' to permit spring 173 to return lock levers 136a, 136b to the first position, lever link 106b to its non-actuated position, and lock pin 144 to its first position. If required, a torsion spring can be mounted between trigger plate 202 and housing 28 to directly bias trigger plate 202 toward its rearward position. A stop pin 212 is mounted to housing plate 40b and cooperates with a detent 214 formed in dump cam 154' to limit rotation of dump cam 154' (and lever link 106b) to prevent movement of lock pawl 70 out of its first position during actuation of dump actuator 38. Finally, recline link 112' is shown to be modified to eliminate recline slot 118.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat recliner for use in a seat assembly having a seatback supported for pivotal movement relative to a seat bottom, said seat recliner comprising:

a housing adapted to be secured to one of the seat bottom and the seatback;

a recliner rod having a first end secured to the other of the seat bottom and the seatback and a second end supported for sliding movement relative to said housing;

a cradle supported from said housing for movement between a first position and a second position;

a lock pawl supported from said cradle for movement between a locked position and a released position in response to movement of said cradle between its first and second positions, said lock pawl is in latched engagement with said second end of said recliner rod when located in its locked position and is released from latched engagement with said second end of said recliner rod when located in its released position;

a recline operator for selectively moving said cradle from its first position to its second position to permit movement of said recliner rod relative to said housing for adjusting the use position of the seatback;

a lock pin supported from said housing for movement between a first position whereat said lock pawl is prevented from moving relative to said cradle and a second position whereat said lock pawl is released for movement relative to said cradle; and a dump operator for selectively moving said lock pin from its first position to its second position with said cradle maintained in its first position and said lock pawl maintained in its locked position to permit concurrent movement of said lock pawl and said second end of said recliner rod relative to said housing in response to movement of the seatback from a use position to a forward dumped position.

2. The seat recliner of claim 1 wherein said lock pawl includes teeth which are adapted to mesh with teeth on said second end of said recliner rod when said lock pawl is in its locked position, and said teeth on said lock pawl are displaced from said teeth on said second end of said recliner rod when said lock pawl is in its released position.

3. The seat recliner of claim 1 wherein said lock pawl is located in a memory position relative to said cradle when said lock pin is in its first position, and wherein movement of said lock pin to its second position releases said lock pawl for sliding movement relative to said cradle from its memory position to a dump position in response to movement of the seatback from the use position to the forward dumped position.

4. The seat recliner of claim 3 further comprising a memory latch mechanism for holding said lock pin in its second position during movement of said lock pawl between its memory and dump positions and automatically moving said lock pin from its second position to its first position upon said lock pawl being returned to its memory position when the seatback is returned to its previous use position.

5. The seat recliner of claim 4 wherein said memory latch mechanism includes a lockout member supported from said housing for movement between a first position and a second position, said lockout member held in its first position by said lock pawl when said lock pin is in its first position, and a spring member for urging said lockout member to move to its second position in response to movement of said lock pawl out of its memory position, and said lockout member is operable in its second position to hold said lock pin in its second position.

6. The seat recliner of claim 3 wherein said cradle includes a lug retained in a guide slot formed in said housing for guiding movement of said cradle between its first and second positions.

7. The seat recliner of claim 6 further comprising:

a locking cam supported from said housing for movement between a first position and a second position and having a cam slot formed therein through which said lug on said cradle extends, said cam slot being contoured such that movement of said locking cam between its first and second positions causes corresponding movement of said cradle between its first and second positions;

a mechanism for connecting said recline operator to said locking cam to permit movement of said locking cam from its first position to its second position; and a first spring member for biasing said locking cam toward its first position.

8. The seat recliner of claim 7 further comprising:

a lock lever supported from said housing for movement between a first position and a second position, said lock lever having a drive slot formed therein through which said lock pin extends such that said lock pin moves between its first and second positions in response to movement of said lock lever between its first and second positions;

a lever link supported from said housing for movement between a non-actuated position and an actuated position, said lever link operably connected to said dump operator;

a dump cam fixed for movement with said lever link and engagable with said lock lever such that movement of said lever link between its non-actuated and actuated positions causes corresponding movement of said lock lever between its first and second positions; and a second spring member for biasing said lever link to its non-actuated position.

9. A seat recliner for use in a seat assembly having a seatback supported for pivotal movement relative to a seat bottom, said seat recliner comprising:

a housing adapted to be secured to one of the seatback and the seat bottom;

a recliner rod having a first end adapted to be secured to the other of the seatback and seat bottom and a second end supported for linear movement relative to said housing;

a cradle supported from said housing for movement between a first position and a second position;

a lock pawl supported for movement with said cradle such that said lock pawl is located in a locked position engaging said second end of said recliner rod when said cradle is in its first position and said lock pawl is located in a released position disengaged from said second end of said recliner rod when said cradle is in its second position;

a locking cam engaging said cradle and supported from said housing for movement between a first position whereat said cradle is located in its first position and a second position whereat said cradle is located in its second position;

a first spring for biasing said locking cam to its first position;

a recline operator for selectively moving said locking cam from its first position to its second position to permit sliding movement of said second end of said recliner rod relative to said housing to adjust the angular use position between the seatback and seat bottom;

a lock pin supported from said housing for movement between a first position whereat said lock pawl is prevented from moving relative to said cradle and a second position whereat said lock pawl is released to move relative to said cradle;

a lock lever acting on said lock pin and supported from said housing for movement between a first position whereat said lock pin is located in its first position and a second position whereat said lock pin is located in its second position;

a second spring for biasing said lock lever to its first position;

a dump operator for selectively moving said lock lever from its first position to its second position with said cradle in its first position and said lock pawl in its locked position to permit movement of said lock pawl from a memory position adjacent to said cradle to a dump position displaced from said cradle in response to linear movement of said second end of said recliner rod relative to said housing caused by movement of the seatback from a use position to a forward dumped position;

a lockout member supported for movement between a first position and a second position, said lockout member being maintained in its first position by said lock pawl when said lock pin is in its first position; and a third spring for moving said lockout member from its first position to its second position in response to movement of said lock pawl from the memory position to the dump position, said lockout member operable in its second position to hold said lock pin in its second position.

10. The seat recliner of claim 9 wherein said lock pawl includes teeth which are adapted to mesh with teeth on said second end of said recliner rod when said lock pawl is in its locked position, and said teeth on said lock pawl are displaced from said teeth on said second end of said recliner rod when said lock pawl is in its released position.

11. The seat recliner of claim 9 wherein said lock pawl moves from the dump position to the memory position in response to movement of said second end of said recliner rod relative to said housing caused by movement of the seatback from its forward dumped position to its previous use position, whereby movement of said lock pawl to the memory position causes said lockout member to be moved from its second position to its first position for releasing said lock pin for movement from its second position to its first position, whereby the seatback is relatched in its previous use position.

12. The seat recliner of claim 9 wherein said cradle includes a lug that is retained in a guide slot formed in said housing for guiding movement of said cradle between its first and second positions.

13. The seat recliner of claim 12 wherein said locking cam has a cam slot formed therein through which said lug on said cradle extends, said cam slot being contoured such that movement of said locking cam between its first and second positions causes corresponding movement of said cradle between its first and second positions, and further comprising a mechanism for connecting said recline operator to said locking cam to permit movement of said locking cam from its first position to its second position in opposition to the biasing of said first spring.

14. The seat recliner of claim 13 further comprising:

a lever link operably connected to said dump operator and supported from said housing for movement between a non-actuated position and an actuated position; and a dump cam fixed for movement with said lever link and engagable with said lock lever such that movement of said lever link between its non-actuated and actuated positions causes corresponding movement of said lock lever between its first and second positions.

15. The seat recliner of claim 9 wherein said lockout member is a stop plate supported from said cradle for sliding movement between its first and second positions.

16. The seat recliner of claim 9 wherein said lockout member is a trigger cam supported from said housing for pivotal movement between its first and second positions.

17. A seat recliner for use in a seat assembly having a seatback supported for pivotal movement relative to a seat bottom, said seat recliner comprising:

a housing adapted to be secured to one of the seatback and the seat bottom;

a recliner rod having a first end adapted to be secured to the other of the seatback and seat bottom and a second end supported for linear movement relative to said housing;

a cradle supported from said housing for movement between a first position and a second position;

a lock pawl supported for movement with said cradle such that said lock pawl is located in a locked position engaging said second end of said recliner rod when said cradle is in its first position and said lock pawl is located in a released position disengaged from said second end of said recliner rod when said cradle is in its second position;

a first spring for biasing said cradle to its first position;

a recline operator for selectively moving said cradle from its first position to its second position to permit sliding movement of said second end of said recliner rod relative to said housing to adjust the use position between the seatback and the seat bottom;

a lock pin supported from said housing for movement between a first position whereat said lock pawl is prevented from moving relative to said cradle and a second position whereat said lock pawl is released to move relative to said cradle;

a second spring for biasing said lock pin to its first position;

a dump operator for selectively moving said lock pin from its first position to its second position with said cradle in its first position and said lock pawl in its locked position to permit movement of said lock pawl from a memory position adjacent to said cradle to a dump position displaced from said cradle in response to linear movement of said second end of said recliner rod relative to said housing caused by movement of the seatback from its use position to a forward dumped position;

a lockout member supported for movement between a first position and a second position, said lockout member being maintained in its first position by said lock pawl when said lock pin is in its first position; and a third spring for moving said lockout member from its first position to its second position in response to movement of said lock pawl from the memory position to the dump position, said lockout member is operable in its second position to engage and hold said lock pin in its second position.

18. The seat recliner of claim 17 wherein said lock pawl includes teeth which are adapted to mesh with teeth on said second end of said recliner rod when said lock pawl is in its locked position, and said teeth on said lock pawl are displaced from said teeth on said second end of said recliner rod when said lock pawl is in its released position.

19. The seat recliner of claim 17 wherein said lock pawl moves from the dump position to the memory position in response to movement of said second end of said recliner rod relative to said housing caused by movement of the seatback from its forward dumped position to its previous use position, whereby movement of said lock pawl to the memory position causes said lockout member to be moved from its second position to its first position for releasing said lock pin for subsequent movement from its second position to its first position, whereby the seatback is relatched in its previous use position.

20. The seat recliner of claim 19 wherein said cradle includes a lug retained in a guide slot formed in said housing for guiding movement of said cradle between its first and second positions.

21. The seat recliner of claim 20 further comprising:

a locking cam supported from said housing for movement between first and second positions, said locking cam having a cam slot formed therein through which said lug on said cradle extends, said cam slot being contoured such that movement of said locking cam between its first and second positions causes corresponding movement of said cradle between its first and second positions; and a mechanism for connecting said recline operator to said locking cam to permit movement of said locking cam from its first position to its second position, and wherein said first spring acts to bias said locking cam toward its first position.

22. The seat recliner of claim 21 further comprising:

a lever link operably connected to said lock pin and supported from said housing for movement between a non-actuated position and an actuated position, such that movement of said lever link between its non-actuated and actuated positions causes corresponding movement of said lock pin between its first and second positions; and a mechanism for connecting said lever link to said dump operator to permit movement of said lever link from its first position to its second position in opposition to the biasing of said second spring.

23. The seat recliner of claim 17 wherein said lockout member is a stop plate supported from said cradle for sliding movement between its first and second positions.

24. The seat recliner of claim 17 wherein said lockout member is a trigger cam supported from said housing for pivotal movement between its first and second positions.

* * * * *